US009600322B1

(12) United States Patent
Ramasubramanian et al.

(10) Patent No.: US 9,600,322 B1
(45) Date of Patent: *Mar. 21, 2017

(54) LEVERAGING MULTIPROCESSOR FABRIC LINK AGGREGATION

(71) Applicant: International Business Machines Corporation, Armonk, NY (US)

(72) Inventors: Hariharasubramanian Ramasubramanian, Bangalore (IN); Jinu J. Thomas, Bangalore (IN); Venkatesh Sainath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,906

(22) Filed: Nov. 10, 2015

Related U.S. Application Data

(63) Continuation of application No. 14/870,670, filed on Sep. 30, 2015.

(51) Int. Cl.
| | |
|---|---|
| *G06F 3/00* | (2006.01) |
| *G06F 9/455* | (2006.01) |
| *G06F 13/42* | (2006.01) |
| *G06F 13/12* | (2006.01) |
| *G06F 3/0481* | (2013.01) |

(Continued)

(52) U.S. Cl.
CPC ........ *G06F 9/45558* (2013.01); *G06F 3/0481* (2013.01); *G06F 3/0484* (2013.01); *G06F 9/54* (2013.01); *G06F 13/126* (2013.01); *G06F 13/4234* (2013.01); *G06F 2009/4557* (2013.01); *G06F 2009/45579* (2013.01); *G06F 2009/45591* (2013.01); *G06F 2009/45595* (2013.01)

(58) Field of Classification Search
CPC ........................................................ G06F 9/54
USPC ........................................................ 719/310
See application file for complete search history.

(56) References Cited

U.S. PATENT DOCUMENTS 8,074,092 B2    12/2011  Fung
9,300,489 B1 *   3/2016  Nolle ...................... H04L 12/56
(Continued)

FOREIGN PATENT DOCUMENTS

WO      2014143822 A1      9/2014

OTHER PUBLICATIONS

Yasuhiro, High-Bandwidth Plastic Optical Fiber for Fiber to the Display, 2006.*

(Continued)

*Primary Examiner* — Lechi Truong
(74) *Attorney, Agent, or Firm* — Gregory M. Nordstrom

(57) ABSTRACT

Data access patterns between at least three nodes within a single symmetric multiprocessing server may be monitored by at least one hypervisor. At the hypervisor, mappings for the data access patterns may be generated for the at least three nodes. Based upon the mappings, the hypervisor may determine that the data access patterns for at least two of the at least three nodes are outside of a bandwidth threshold. In response to determining that the data access patterns for at least two of the at least three nodes are outside of a bandwidth threshold, the hypervisor may formulate an asymmetric cabling plan. Based upon the asymmetric cabling plan, a recommendation to alter the multiprocessor fabric link aggregation may be displayed to a user through a graphical user interface.

4 Claims, 4 Drawing Sheets

(51) Int. Cl.
*G06F 3/0484* (2013.01)
*G06F 9/54* (2006.01)

(56) References Cited

U.S. PATENT DOCUMENTS

| | | | | |
|---|---|---|---|---|
| 2007/0192482 A1* | 8/2007 | Smith | ............... | H04L 41/145 |
| | | | | 709/224 |
| 2012/0284393 A1* | 11/2012 | Gandhi | ............ | H04W 72/1252 |
| | | | | 709/224 |
| 2013/0335430 A1 | 12/2013 | Douglas et al. | | |
| 2015/0142976 A1* | 5/2015 | Farasat | ............... | H04L 47/70 |
| | | | | 709/226 |

OTHER PUBLICATIONS

Ramasubramanian, et al., "Recommending an Asymmetric Multi-processor Fabric Link Aggregation", U.S. Appl. No. 14/870,619, filed Sep. 30, 2015.

Wikipedia, "Network Topology". Last modified on Sep. 22, 2015 at 12:23. Last printed on Sep. 22, 2015, 11:06 AM. 9 pages. https://en.wikipedia.org/wiki/Network_topology.

Wikipedia, "Node (networking)". Last modified on Sep. 15, 2015, at 22:11. Last printed on Sep. 22, 2015, 11:11 AM. 3 pages. https://en.wikipedia.org/wiki/Node_%28networking%29.

Wikipedia, "Hypervisor". Last modified on Sep. 1 2015, at 15:12. Last Last printed on Sep. 22, 2015, 11:17 AM. 6 pages. https://en.wikipedia.org/wiki/Hypervisor.

Wikipedia, "Asymmetric multiprocessing". Last modified on Sep. 21, 2015, at 20:14. Last printed on Sep. 22, 2015, 11:23 AM. 5 pages. https://en.wikipedia.org/wiki/Asymmetric_multiprocessing.

Wikipedia, "Symmetric multiprocessing". Last modified on Sep. 10, 2015, at 15:29. Last printed on Sep. 22, 2015, 11:34 AM. 6 pages.

Rosca, et al., "IBM PowerVP: Introduction and Technical Overview", IBM RedPaper, Second Edition (Aug. 2015). 122 pages. © Copyright International Business Machines Corporation 2014, 2015.

Ramasubramanian, et al., "Leveraging Multiprocessor Fabric Link Aggregation", U.S. Appl. No. 14/870,670, filed Sep. 30, 2015.

IBM, List of IBM Patents or Patent Applications Treated as Related, Nov. 3, 2015. 2 pages Kim, et al., "Energy Optimization Techniques in Cluster Interconnects", ISLPED'03, Aug. 25-27, 2003. Seoul, Korea. 6 pages.

* cited by examiner

LEVERAGING MULTIPROCESSOR FABRIC LINK AGGREGATION

BACKGROUND

The present disclosure relates generally to multiprocessing, and more particularly, to fabric link aggregation within a multiprocessing server. Multiprocessing allows a server to have multiple applications running simultaneously while sharing a common memory and balancing workload requirements. As the number of applications and the various uses of the applications increase, the need to balance the workload requirements within the multiprocessing server may also increase.

SUMMARY

Aspects of the disclosure provide a method, system, and computer program product for leveraging multiprocessor fabric link aggregation. The method, system, and computer program product may include monitoring, by at least one hypervisor, data access patterns between at least three nodes within a single symmetric multiprocessing server. At the hypervisor, mappings for the data access patterns may be generated for the at least three nodes. Based upon the mappings, the hypervisor may determine that the data access patterns for at least two of the at least three nodes are outside of a bandwidth threshold. In response to determining that the data access patterns for at least two of the at least three nodes are outside of a bandwidth threshold, the hypervisor may formulate an asymmetric cabling plan. Based upon the asymmetric cabling plan, a recommendation to alter the multiprocessor fabric link aggregation may be displayed to a user through a graphical user interface.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
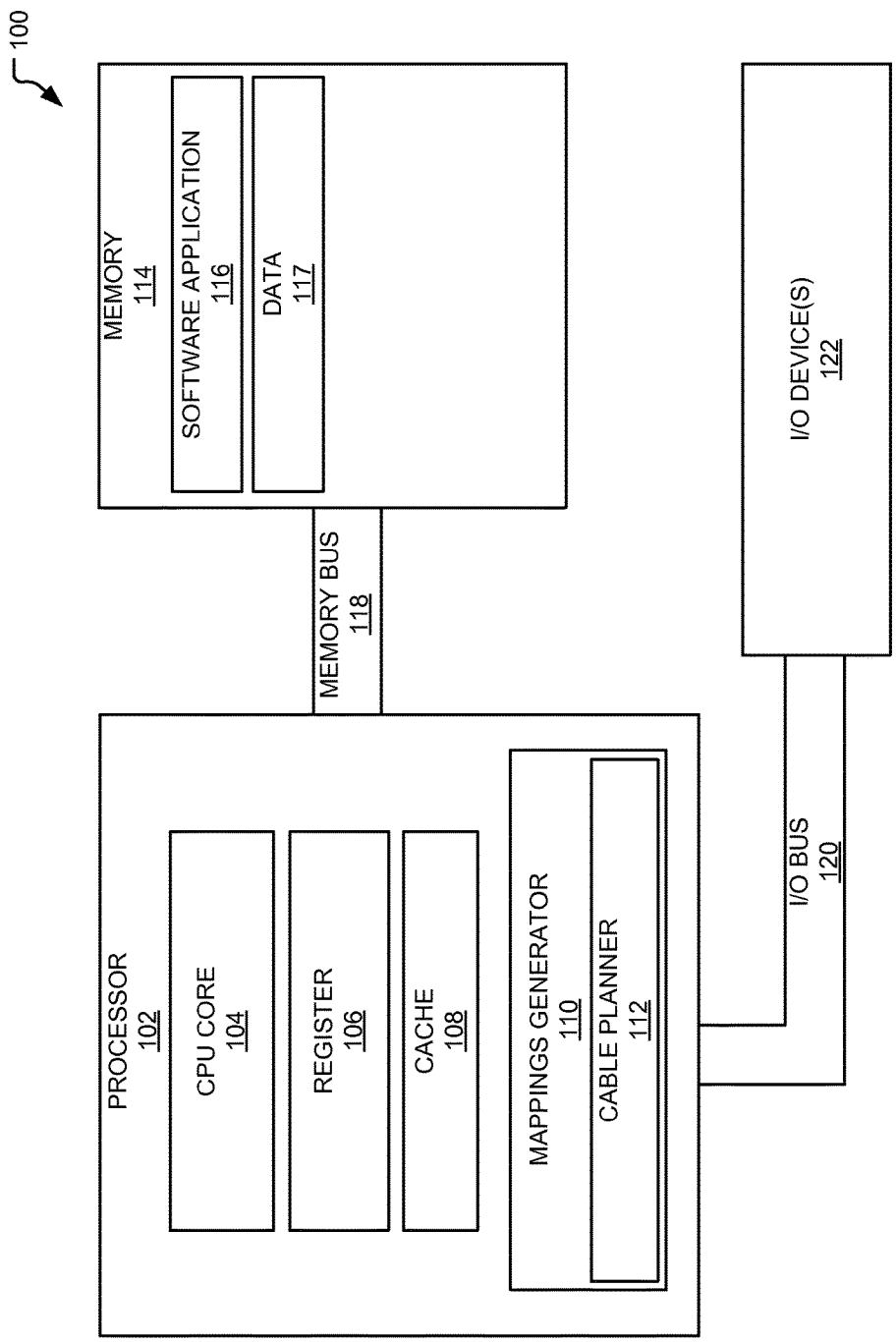
FIG. 1 depicts one embodiment of an example computer processing system with a mappings generator and a cable planner.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate to multiprocessing servers, and more particular aspects relate to leveraging fabric link aggregation within multiprocessing servers. Symmetric multiprocessing (SMP) involves a symmetric multiprocessor system hardware and software architecture where two or more processors are connected to a single, shared memory, have full access to all input/output (I/O) devices, and are controlled by a single operating system that treats all processors equally. SMP systems are tightly coupled multiprocessor systems with a pool of processors running independently. Each processor may execute different programs and may work on different data while having the capability of sharing common resources (e.g., memory, I/O devices) and connecting using a system bus or a crossbar. SMP systems allow any processor to work on any task no matter where the data for that task is located in memory, provided that each task in the system is not in execution on two or more processors at the same time. In the case of multi-core processors, the SMP architecture applies to the cores, treating them as separate processors.

In contrast, in an asymmetric multiprocessing (AMP) system, not all processors are treated equally. For example, an AMP system may allow (either at the hardware or operating system level) one processor to only execute operating system code or another processor to only perform I/O operations. In another example, an AMP system may allow any processor to execute operating system code and perform I/O operations such that all processors are symmetric with respect to processor roles, but the processors may have additional peripherals (e.g., input, output, and secondary storage devices) assigned to particular processors, so that they are asymmetric with respect to peripheral assignments.

SMP and AMP systems both utilize network topology for communication between nodes and/or processors. Network topology is the arrangement of various elements (e.g., links, nodes) of a computer network. Specifically, physical topology is the placement of the various components of a system, including device location and cable installation. In multi-node servers, cables between the nodes carry the inter-node traffic. Additionally, processors may be interconnected using buses, crossbar switches, or on-chip mesh networks. In conventional symmetric multiprocessing servers, the cables are symmetrically connected between the nodes such that each node is connected to every other node with the same number of connections (e.g., a SMP system configuration), thereby avoiding any latency in data access between any two nodes. For example, in a SMP system with four nodes, the first node may be connected to the second node with two cables, to the third node with two cables, and to the fourth node with two cables.

However, embodiments of the present disclosure provide a system and method for recommending an intentionally asymmetric cabling structure within a single symmetric multiprocessing server based on workload requirements. A hypervisor may monitor data access patterns between at least three nodes within the single symmetric multiprocessing server. By monitoring the nodes, the hypervisor may create mappings (e.g., data transformation) for the data access patterns. In some embodiments, data access patterns may include the manner in which workloads running on one node are accessing the resources (e.g., memory, accelerators) on other nodes. For example, in the case of memory read/writes, the frequency of access and the size of writes may be used to determine a data access pattern. In certain embodiments, the mappings may include the amount of data transferred between workloads across nodes, the amount of data transferred to/from workloads from/to I/O adapters, or the amount of data transferred between the nodes by workloads operating in another one of the nodes. When any of the data access patterns are outside of a predetermined bandwidth threshold, the hypervisor may devise an asymmetric cabling plan to alter the bandwidth in order to increase the bandwidth where the threshold was breached.

Hence, the embodiments described herein alleviate potential bottlenecks in the scalability of SMP systems using cables, buses, or crossbar switches due to an uneven distribution of resources. That is, the bandwidth and power consumption of the connections among the various processors, the memory, and the disk arrays may result in an uneven distribution of resources. For example, when multiple partitions are created to host multiple workloads on a multi-node server, it may be unnecessary for data access patterns and hence the bandwidth requirement between all nodes, to be symmetrical. By intentionally implementing an asymmetric cabling structure for a single SMP server, the embodiments described herein help alleviate such bottlenecks. While the present disclosure is not necessarily limited to such applications, various aspects of the disclosure may be appreciated through a discussion of various examples using this context.

Referring now to FIG. 1, a computer processing system 100 with a mappings generator and a cable planner can be seen according to some embodiments. In some embodiments, the computer processing system 100 can include a processor 102, memory 114, and I/O (input/output) devices 122.

The processor 102 can execute instructions stored in memory 114 and perform various functions in the computer processing system 100. The processor 102 can include, but is not limited to, a CPU core 104, a register 106, a cache 108, and a mappings generator 110 which can include a cable planner 112. The CPU core 104 can provide logic for the processor 102. In some embodiments, the processor 102 can contain multiple CPU cores. The cache 108 and register 106 can provide storage for data that is frequently accessed by the processor 102. In some embodiments, the computer processing system 100 can contain multiple processors 102 typical of a relatively large system. In some embodiments, the computer processing system 100 can be a single processor system (e.g., an SMP/AMP system). The processor 102 can include various types of processors such as, digital signal processor (DSP) hardware, network processor, application specific integrated circuit (ASIC), field programmable gate array (FPGA), or other types of processors. The memory 114 can be coupled to the processor 102 via a memory bus 118.

The mappings generator 110 can monitor the data access patterns by the processor 102 to create real time mappings of the computer processing system 100. The cable planner 112 can be coupled to, or a part/subsystem of the mappings generator 110. According to some embodiments, the cable planner 112 may provide a recommendation to alter the multiprocessor fabric link aggregation (hereinafter used interchangeably with the term cabling structure) of the computer processing system 100 based on the mappings created at the mappings generator 110. In embodiments, the multiprocessor fabric link aggregation may be the physical topology of a multi-node server, such as connecting nodes with SMP cables.

The processor 102, the mappings generator 110, and the cable planner 112 can be configured to operate as described in some embodiments. For example, the cable planner 112 can be configured to analyze the current cabling structure of the computer processing system 100, devise an alternative asymmetric cabling plan based upon mappings created at the mappings generator 110, and recommend to a user which cables need to be modified (e.g., change cable connection originating and terminating ports) to create an asymmetric cabling structure. The processor 102 or other logic device can be configured to monitor specific data access patterns between nodes of the computer processing system 100, such as the amount of data transferred between workloads across nodes. In some embodiments, the mappings generator may utilize the data access patterns monitored by the processor 102 to create mappings to be used by the cable planner 112.

The memory 114 can include a random-access semiconductor memory, storage device, or storage medium (either volatile or non-volatile) for storing or encoding data and programs. The memory 114 can be conceptually a single monolithic entity, but in some embodiments, the memory 114 can be a more complex arrangement, such as a hierarchy of caches and other memory devices. The memory 114 can store data (e.g., data 117), instructions, modules, and other types of information, hereafter collectively referred to as "memory elements." Although the memory elements are illustrated as being contained within the memory 114, in some embodiments some or all of them can be on different devices and can be accessed remotely, e.g., via a network.

The computer system 100 can use virtual addressing mechanisms that allow the programs of the computer system 100 to behave as if they only have access to a large, single storage entity instead of access to multiple, smaller storage entities. Thus, while the memory elements are illustrated as being contained within the memory 114, these elements are not necessarily completely contained in the same storage device at the same time. Further, although the memory elements are illustrated as being separate entities, in some embodiments some of them, portions of some of them, or all of them can be packaged together.

In some embodiments, the memory elements can include a software application 116 and data 117. The memory elements can be instructions or statements that execute in the processor 102 to carry out some embodiments. The software application 116 can instruct the computer processing system 100 to carry out events or processes which are monitored by the processor 102 using mappings generator 110 and the cable planner 112. The data 117 can be various types of data stored in memory 114. In some embodiments, the data 117 can include data access patterns and/or mappings collected from the mappings generator 110 and asymmetric multiprocessor fabric link aggregations created at the cable planner.

The processor 102 can also communicate with one or more I/O devices 122 via an I/O bus 120. The I/O devices 122 can include, but are not limited to, devices such as a keyboard, a pointing device, a display, one or more devices that enable a user to interact with the computer processing system 100, and various devices (e.g., network interface card, modem, etc.) that enable the computer processing system 100 to communicate with one or more other computing devices. It should be understood that other suitable hardware and software components can be used in conjunction with the computer processing system 100.

Figure 2:
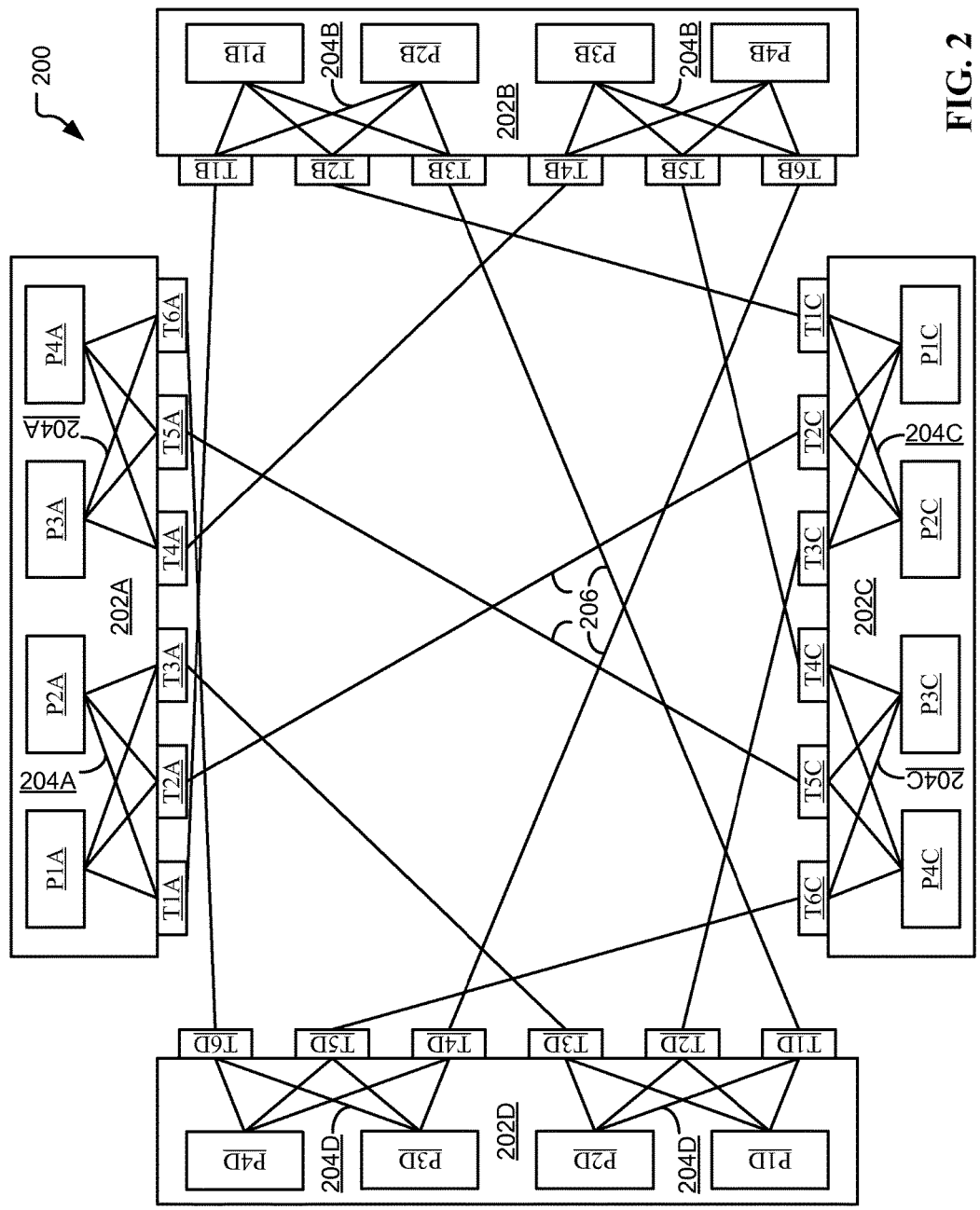
FIG. 2 depicts one embodiment of an example symmetric multiprocessing server having a symmetric cabling structure.

FIG. 2 depicts one embodiment of an example symmetric multiprocessing server having a symmetric cabling structure. The SMP server 200 includes a plurality of nodes 202A-202D. In some embodiments, the nodes 202A-202D can include, but are not limited to, a plurality of respective processors P1A-P4A-P1D-P4D. In various embodiments, the processors P1A-P4A-P1D-P4D may reside across multiple daughter cards. In certain embodiments, the plurality of processors P1A-P4A-P1D-P4D may include, but are not limited to, a plurality of originating ports for respective cables 204A-204D. For example, as shown in the SMP server 200, each processor P1A-P4A-P1D-P4D within each respective node 202A-202D has three respective cables (e.g., 204A-204D) connecting the processors P1A-P4A-P1D-P4D to respective terminals T1A-T6A-T1D-T6D originating from a single point at each respective processor. In various embodiments, the three cables connecting the processors P1A-P4A-P1D-P4D to terminals T1A-T6A-T1D-T6D may each have a separate originating point within each processor. The cables 204A-204D may be utilized as internode bus connections. In some embodiments, the cables 204A-204D may use parallel and/or bit serial connections to communicate data between the nodes 202A-202D.

In the SMP server 200, each node 202A-202D has a plurality of respective terminals T1A-T6A-T1D-T6D. The terminals T1A-T6A-T1D-T6D connect the nodes 202A-202D through a plurality of cables 206. In various embodiments, the terminals T1A-T6A-T1D-T6D may include indicator lights for cable identification. The plurality of cables 206 carry the inter-node traffic between the nodes 202A-202D. The plurality of cables 206 in the SMP server 200 are arranged such that each node 202A-202D is connected to every other node with the same number of connections. For example, at node 202A, the terminals T1A and T4A are connected to the terminals T1B and T4B of node 202B, the terminals T2A and T5A are connected to the terminals T2C and T5C of node 202C, and the terminals T3A and T6A are connected to the terminals T3D and T6D of node 202D. Similarly, at node 202C, the terminals T1C and T4C are connected to the terminals T2B and T5B of node 202B, the terminals T2C and T5C are connected to the terminals T2A and T5A of node 202A, and the terminals T3C and T6C are connected to the terminals T2D and T5D of the node 202D. Thus, each node within the SMP server 200 is connected to all other nodes through at least two terminals to reduce latency in data access between the nodes 202A-202D.

Figure 3:
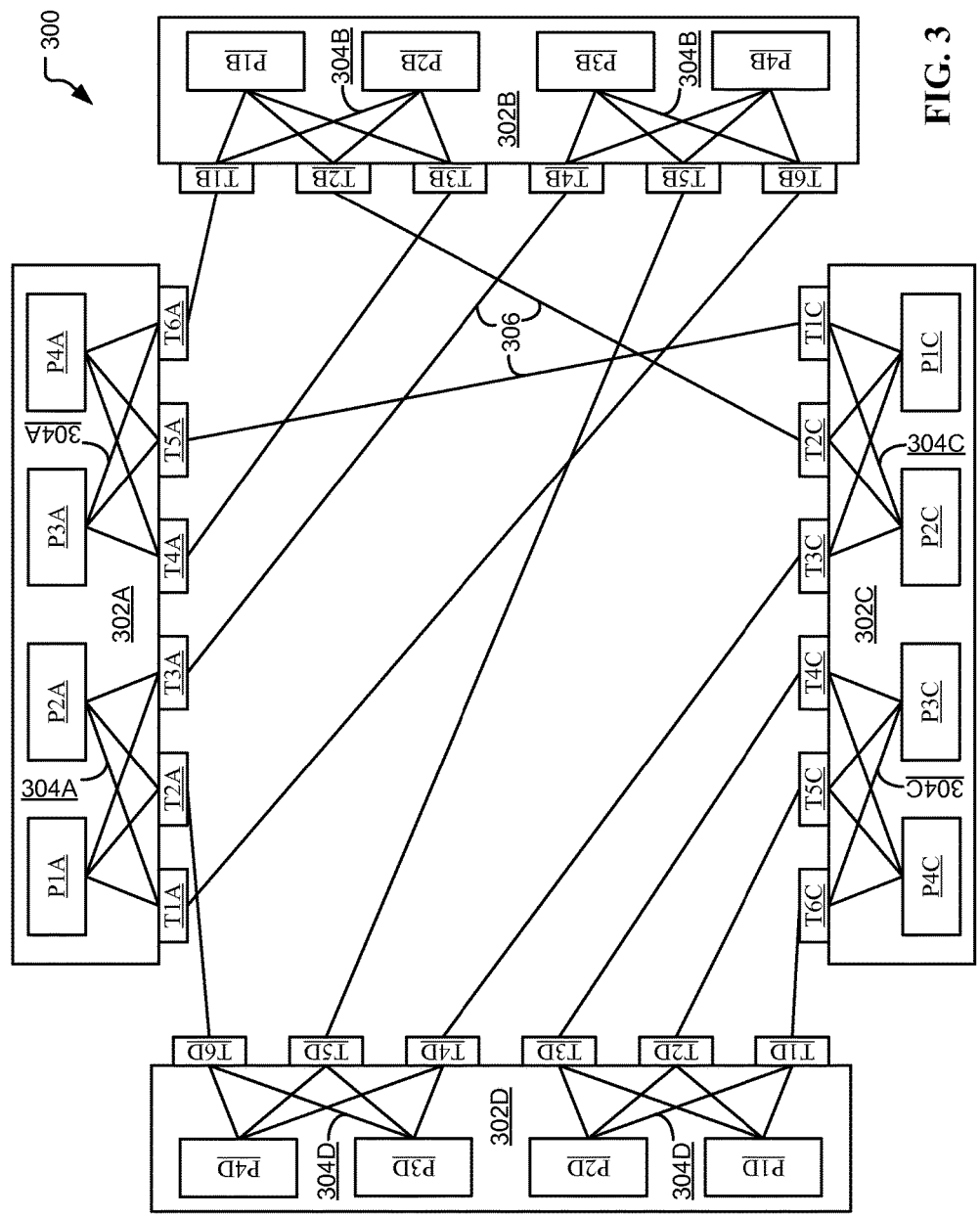
FIG. 3 depicts one embodiment of an example symmetric multiprocessing server having an asymmetric cabling structure.

FIG. 3 depicts one embodiment of an example SMP server having an asymmetric cabling structure. The SMP server 300 includes a plurality of nodes 302A-302D. In some embodiments, the nodes 302A-302D can include, but are not limited to, a plurality of respective processors P1A-P4A-P1D-P4D. In certain embodiments, the plurality of processors P1A-P4A-P1D-P4D may include, but are not limited to, a plurality of originating ports for cables 304A-304D. For example, as shown in the SMP server 300, each processor P1A-P4A-P1D-P4D within each node 302A-302D has three cables (e.g., 304A-304D) connecting the processors P1A-P4A-P1D-P4D to respective terminals T1A-T6A-T1D-T6D originating from a single point at each respective processor. In various embodiments, the three cables connecting the processors P1A-P4A-P1D-P4D to respective terminals T1A-T6A-T1D-T6D may each have a separate originating point within each processor. The cables 304A-304D may be utilized as internode bus connections. In some embodiments, the cables 304A-304D may use parallel and/or bit serial connections to communicate data between the nodes 302A-302D.

In the SMP server 300, each node 302A-302D has a plurality of respective terminals T1A-T6A-T1D-T6D. The terminals T1A-T6A-T1D-T6D connect the nodes 302A-302D through a plurality of cables 306. In various embodiments, the terminals T1A-T6A-T1D-T6D may include indicator lights for cable identification. The plurality of cables 306 carry the inter-node traffic between the nodes 302A-302D. In the example shown in FIG. 3, the SMP server 300 utilizes a recommended asymmetrical cabling plan generated in response to determining that the data access patterns between the nodes 302A-302D of the SMP server 300 have exceeded a bandwidth threshold. For example, a hypervisor may determine that the data access patterns between nodes in an SMP server (e.g., FIG. 2) are imbalanced such that a bandwidth threshold between two sets of nodes (e.g., 202A-202B and 202C-202D) has been exceeded. Thus, the SMP server 300 may be arranged by changing the plurality of cables 306 to maximize bandwidth between nodes 302A-302B and nodes 302C-302D without losing a symmetric multiprocessor structure.

For instance, each node 302A-302D has at least one connection with every other node in the SMP server 300 in order to ensure a multiprocessing configuration. Node 302A is connected to node 302B using terminal T6A to terminal T1B, to node 302C using terminal T5A to terminal T1C, and to node 302D using terminal T2A to terminal T6D. Additionally, the SMP server 300 has increased the bandwidth between the nodes 302A-302B and 302C-302D because each set of two nodes shares four connection points. For example, nodes 302A and 302B are connected using the terminals T1A-T6B, T3A-T4B, T4A-T3B, and T6A-T1B. Likewise, nodes 302C and 302D are connected using the terminals T3C-T4D, T4C-T3D, T5C-T2D, and T6C-TD1. In some embodiments, the asymmetric configuration of the SMP server 300 helps distribute resources between the nodes where required without encountering performance degradation.

Figure 4:
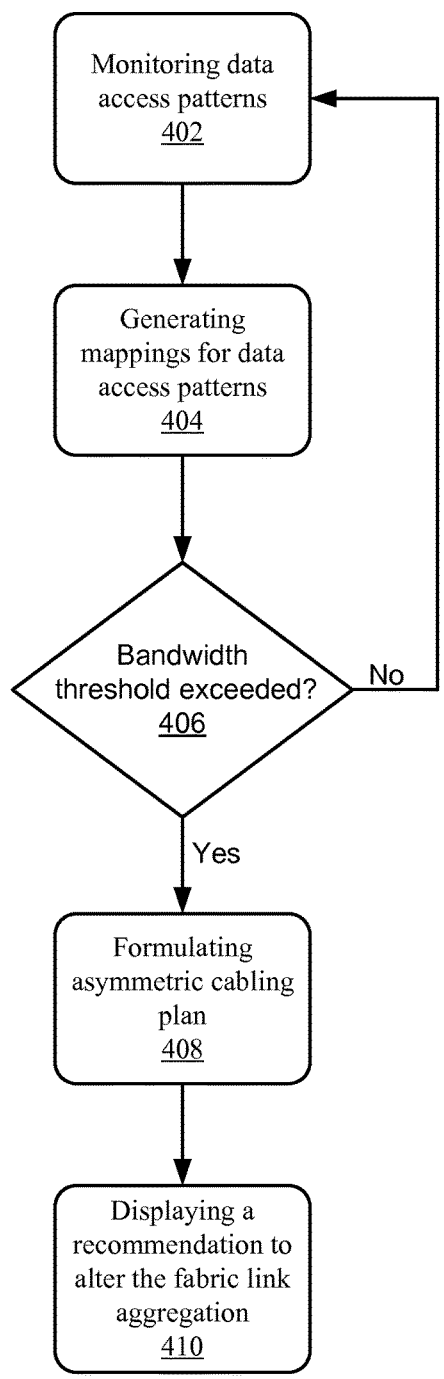
FIG. 4 depicts one embodiment of an example process for leveraging multiprocessing fabric link aggregation.

FIG. 4 depicts one embodiment of an example process for leveraging multiprocessing fabric link aggregation. The method 400 can be implemented by a computing device, such as the processor 102 implementing the mappings generator 110 and the cable planner 112. In various embodiments, a hypervisor may perform the same functions as the mappings generator 110 and the cable planner 112. In certain embodiments, the SMP server may initially operate under a cabling plan where the bandwidth between all the nodes within the SMP server are equal. At block 402, a hypervisor monitors data access patterns between nodes within a SMP server. Data access patterns may include, but are not limited to, the way in which workloads (e.g., the amount of work performed by a node in a given period of time, or the average amount of work handled by a node at a particular instant of time) running on a first node are accessing the resources on a second node. In another example, the data access patterns may include access between processors located within the nodes and secondary caches, such as an off-processor cache, solid state drive (SSD), or long term storage device. In some embodiments, nodes within the SMP system may be monitored by a single hypervisor which spans across the nodes of the SMP server. In other embodiments, nodes within the SMP server may be monitored by a plurality of hypervisors. For example, in a SMP server containing four nodes, three nodes may be run and monitored by one hypervisor (e.g., PowerVM®, PowerVM is a registered trademark of International Business Machines Corporation of Armonk, N.Y.) and one node may be run and monitored by a second hypervisor (e.g., PowerKVM™).

At block 404, the one or more hypervisors monitoring the data access patterns between the nodes of the SMP server generate mappings based on the data access patterns. In some embodiments, generating mappings may include data transformation and/or identification of data relationships as part of a data analysis. The mappings may include, but are not limited to, the amount of data transferred between workloads across nodes, the amount of data transferred to/from workloads from/to I/O adapters, and/or the amount of data transferred between the nodes by workloads operating in other nodes.

At block 406, the hypervisor determines whether or not the mappings generated at block 404 have exceeded a bandwidth threshold. In some embodiments, the bandwidth threshold may be user defined before the data access patterns are monitored at block 402. In certain embodiments, the bandwidth threshold may be determined based upon bandwidth requirements of the SMP server since the max bandwidth of each cable connected between nodes of the SMP server is known. In certain embodiments, the bandwidth threshold for one data access pattern and mapping may be a different bandwidth threshold for a second data access pattern and mapping. For example, a hypervisor may be defined such that the bandwidth threshold for memory reads and writes across two nodes may be 2 Gigabytes per second whereas the bandwidth threshold for hardware access (e.g., accelerators, SSD) may be 10 Gigabytes per second. If the data access patterns do not exceed the bandwidth thresholds, the hypervisor may continue to monitor the data access patterns at block 402.

In response to determining that the data access patterns have exceeded a bandwidth threshold, the hypervisor may formulate an asymmetric cabling plan (e.g., FIG. 3) for the SMP server at block 408. In some embodiments, formulating an asymmetric cabling plan may include determining which nodes within the SMP server are communicating with each other more frequently. For example, in an SMP server where a database is consuming 144 cores (e.g., spanning across three nodes where each node contains 48 cores) and a webserver is consuming 48 cores (e.g., spanning across a fourth node), the cabling plan of the SMP server may be evaluated to determine which cables should be altered in order to provide more bandwidth between the three nodes while still maintaining a minimum bandwidth between the fourth node and the other nodes in the server.

In another example, an SMP server has a database which is consuming 48 cores (e.g., spanning across a first node where each node within the SMP server contains 48 cores) and the SMP server has an application utilizing the database, which is also consuming 48 cores (e.g., spanning across a second node). Further, the SMP server has a similar database consuming 48 cores (e.g., spanning across a third node) with an application utilizing the similar database consuming 48 cores (e.g., spanning across a fourth node). The cabling plan of the SMP server may be evaluated to determine which cables should be altered to provide more bandwidth between the first and second nodes and the third and fourth nodes since they communicate with each other more frequently.

At block 410, a recommendation to alter the fabric link aggregation of the SMP server is displayed to a user through a graphical user interface. In some embodiments, displaying the recommendation may include the location codes of the cables which need to be altered to conform to the asymmetric plan created at block 408. In certain embodiments, displaying the recommendation may include a pictorial representation of the original system (e.g., FIG. 2) next to a pictorial representation of the recommended system (e.g., FIG. 3). The pictorial representations of the original system and the recommended system may be interacted with by a user such that, if a user wishes to change the asymmetric cabling plan created at block 408, the user may alter the asymmetric cabling plan and view the projected bandwidth traffic patterns through the graphical user interface. In embodiments, based upon the recommended asymmetric cabling plan at the graphical user interface, indicator lights can be used to visually differentiate cables within the single SMP server. For example, the indicator lights for cable identification may illuminate cables to be altered to help facilitate altering the physical cables of the SMP server.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for leveraging multiprocessor fabric link aggregation, comprising:
    monitoring, by at least one hypervisor, data access patterns between at least three nodes within a single symmetric multiprocessing server, wherein the data access patterns are associated with the multiprocessor fabric link aggregation;
    generating, at the least one hypervisor, mappings for the data access patterns at the least three nodes, wherein the mappings for the data access patterns comprise at least one of an amount of data transferred between workloads across the at least three nodes, an amount of data transferred between workloads and input and output adaptors, and an amount of data transferred between one of the at least three nodes by workloads operating in another one of the at least three nodes;
    determining, based upon the mappings, the data access patterns for at least two of the at least three nodes are outside of a bandwidth threshold;
    formulating, in response to determining the data access patterns for at least two of the at least three nodes goes outside of a bandwidth threshold, an asymmetric cabling plan for the at least three nodes within the single symmetric multiprocessor server; and
    displaying to a user through a graphical user interface, based upon the asymmetric cabling plan, a recommendation to alter the multiprocessor fabric link aggregation.

2. The method of claim 1, wherein the recommendation includes location codes of cables to be altered and a pictorial representation of changes to be made within the single symmetric multiprocessing server.

3. The method of claim 2, wherein the pictorial representation is a graphical user interface.

4. The method of claim 1, further including visually differentiating cables within the single symmetric multiprocessing server based upon the recommendation.

* * * * *